(12) United States Patent
Zhang et al.

(10) Patent No.: US 10,986,459 B2
(45) Date of Patent: Apr. 20, 2021

(54) SOUND PRODUCTION DEVICE, DISPLAY SYSTEM, AND SOUND PRODUCTION METHOD

(71) Applicants: Hefei BOE Optoelectronics Technology Co., Ltd., Anhui (CN); BOE Technology Group Co., Ltd., Beijing (CN)

(72) Inventors: Guojun Zhang, Beijing (CN); Jiong Huang, Beijing (CN); Peng Li, Beijing (CN); Lele Han, Beijing (CN); Zhengwei Zhu, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/547,069

(22) Filed: Aug. 21, 2019

(65) Prior Publication Data
US 2020/0245090 A1     Jul. 30, 2020

(30) Foreign Application Priority Data
Jan. 28, 2019     (CN) .......................... 201910079905.5

(51) Int. Cl.
*H04S 7/00* (2006.01)
*G06K 9/00* (2006.01)
(Continued)

(52) U.S. Cl.
CPC .......... *H04S 7/303* (2013.01); *G06K 9/00255* (2013.01); *G10K 11/34* (2013.01);
(Continued)

(58) Field of Classification Search
None
See application file for complete search history.

(56) References Cited

U.S. PATENT DOCUMENTS

| | | | |
|---|---|---|---|
| 9,924,290 B2 | 3/2018 | Babayoff et al. | |
| 2004/0208342 A1* | 10/2004 | Morozumi | A63B 24/0003 382/103 |
| 2020/0245089 A1* | 7/2020 | Zilberman | H04S 7/303 |

FOREIGN PATENT DOCUMENTS

| | | |
|---|---|---|
| CN | 103451848 A | 12/2013 |
| CN | 104683907 A | 6/2015 |

(Continued)

OTHER PUBLICATIONS

Office Action dated Jun. 16, 2020 for application No. CN201910079905.5 with English translation attached.
(Continued)

*Primary Examiner* — Kenny H Truong
(74) *Attorney, Agent, or Firm* — Nath, Goldberg & Meyer; Joshua B. Goldberg (57) ABSTRACT

A sound production device, a display system, and a sound production method for a sound production device. The sound production device includes ultrasonic transducers, a sounding control unit, and a motion unit. The ultrasonic transducers can constitute at least one sounding unit, each of the sounding units includes two ultrasonic transducers, and one ultrasonic transducer in each sounding unit emits a first ultrasonic wave, and the other ultrasonic transducer emits a second ultrasonic wave. The sounding control unit is configured to determine a target direction and output a direction command to the motion unit according to the target direction. The motion unit is configured to adjust a sounding direction of each ultrasonic transducer according to the direction command, such that two ultrasonic transducers in each sounding unit emit sound toward the target direction to generate a difference frequency sound wave within an audible frequency range in a target area.

15 Claims, 4 Drawing Sheets

(51) Int. Cl.
*H04R 1/40* (2006.01)
*H04R 5/02* (2006.01)
*G10K 11/34* (2006.01)
*H04R 3/12* (2006.01)

(52) U.S. Cl.
CPC .............. *H04R 1/403* (2013.01); *H04R 3/12* (2013.01); *H04R 5/02* (2013.01); *H04R 2499/15* (2013.01); *H04S 2400/11* (2013.01)

(56) References Cited

FOREIGN PATENT DOCUMENTS

| | | |
|---|---|---|
| CN | 104937660 A | 9/2015 |
| CN | 105101004 A | 11/2015 |
| CN | 107371097 A | 11/2017 |
| CN | 107776483 A | 3/2018 |
| CN | 108702571 A | 10/2018 |
| JP | S5595500 A | 7/1980 |
| WO | 2017118983 A1 | 7/2017 |

OTHER PUBLICATIONS

First Office Action dated Oct. 8, 2019, for corresponding Chinese application 201910079905.5.

\* cited by examiner

SOUND PRODUCTION DEVICE, DISPLAY SYSTEM, AND SOUND PRODUCTION METHOD

CROSS-REFERENCE TO RELATED APPLICATIONS

The present application claims priority to Chinese Patent Application No. 201910079905.5, filed on Jan. 28, 2019, to the China National Intellectual Property Administration, entitled "SOUND PRODUCTION DEVICE, DISPLAY SYSTEM, AND SOUND PRODUCTION METHOD OF SOUND PRODUCTION DEVICE", the disclosure of which is incorporated herein by reference.

FIELD OF THE INVENTION

The present disclosure relates to, but is not limited to, the field of directional sounding technologies, and in particular to a sound production device, a display system having the sound production device, and a sound production method of the sound production device.

BACKGROUND

Conventional sound production devices directly oscillate air molecules through a horn, and sound waves propagate in various directions. A sound field of the sound waves approximates a spherical distribution. However, the direction of the sound wave emitted by the sound production device may not be oriented to a target direction (an area where a user desires to receive the sound wave). Therefore, the conventional sound production device may generate noise pollution in a non-target direction and is not conducive to protecting privacy of the user.

Directional sounding can well solve the above problems. The directional sounding here means that the sound production device emits a sound wave having a narrow cone-shaped distribution, and the sound wave can be confined to a certain area to propagate. However, in the sound production device of the related art, the directional effect of the emitted sound waves is inferior, and the orientation of the sounding cannot be automatically changed in accordance with the target direction. Therefore, the sound production device in the related art has lowered experience to a user and insufficient convenience.

SUMMARY

For the deficiencies that the directional sounding has an inferior effect and the sounding orientation of the sound production unit cannot be changed with a target direction in the prior art, the present disclosure provides a sound production device, a display system and a sound production method of the sound production device which have an excellent directional effect and are able to automatically change the sounding orientation with the target direction.

According to a first aspect of the disclosure, there is provided a sound production device comprising: a plurality of ultrasonic transducers, a sounding control unit, and a motion unit, wherein the plurality of ultrasonic transducers can constitute at least one sounding unit, each of the sounding units includes two ultrasonic transducers, and one of the ultrasonic transducers in each of the sounding units is configured to emit a first ultrasonic wave, and the other ultrasonic transducer is configured to emit a second ultrasonic wave; the sounding control unit is configured to determine a target direction and output a direction command to the motion unit according to the target direction; and the motion unit is configured to adjust a sounding direction of each ultrasonic transducer according to the direction command, such that two ultrasonic transducers in each sounding unit emit sound toward the target direction to generate a difference frequency sound wave within an audible frequency range in a target area.

According to a second aspect of the disclosure, there is provided a display system comprising: a display device and a sound production device, the sound production device including a plurality of ultrasonic transducers, a sounding control unit, and a motion unit, wherein the plurality of ultrasonic transducers can constitute at least one sounding unit, each of the sounding units includes two ultrasonic transducers, and one of the ultrasonic transducers in each of the sounding units is configured to emit a first ultrasonic wave, and the other ultrasonic transducer is configured to emit a second ultrasonic wave; the sounding control unit is configured to determine a target direction and output a direction command to the motion unit according to the target direction; and the motion unit is configured to adjust a sounding direction of each ultrasonic transducer according to the direction command, such that two ultrasonic transducers in each sounding unit emit sound toward the target direction to generate a difference frequency sound wave within an audible frequency range in a target area.

According to a third aspect of the disclosure, there is provided a sound production method for a sound production device, the sound production device including a plurality of ultrasonic transducers, the plurality of ultrasonic transducers being capable of forming at least a sounding unit, each of the sounding units including two ultrasonic transducers, the method includes steps of: determining at least a target area; selecting at least a sounding unit; determining at least a target direction according to the target area; and emitting a first ultrasonic wave and a second ultrasonic wave to the target direction by ultrasonic transducers of the sounding unit, wherein the first ultrasonic wave and the second ultrasonic wave generate difference frequency sound waves having an audible frequency range in the target area.

DETAILED DESCRIPTION OF THE EMBODIMENTS

In order to better understand the technical solutions of the present disclosure by those skilled in the art, the disclosure will be further described in detail below with reference to the accompanying drawings and specific embodiments.

In the present disclosure, unless otherwise specified, the term "target area" refers to an area (such as a user position) where a difference frequency sound wave is desired to be generated. By adjusting the sounding orientations of the two ultrasonic transducers, the two ultrasonic transducers can produce a difference frequency sound wave in a certain area. In an embodiment of the present disclosure, two ultrasonic transducers are controlled to generate a difference frequency sound wave in a target area.

For two ultrasonic transducers in a sounding unit, when one of ultrasonic transducers emits a first ultrasonic wave toward a first direction and the other emits a second ultrasonic wave toward a second direction, the difference frequency sound wave between the first ultrasonic wave and the second ultrasonic wave is generated and can only propagate in a certain area. If the area is the target area, the first direction is a target direction (e.g., a first target direction) of one of the ultrasonic transducers corresponding to the target area, and the second direction is a target direction (e.g., a second target direction) of the other ultrasonic transducer corresponding to the target area.

As shown in FIGS. 1 to 5, an embodiment of the present disclosure provides a sound production device including a plurality of ultrasonic transducers 11, a sounding control unit 02, and a motion unit 03.

Figure 1:
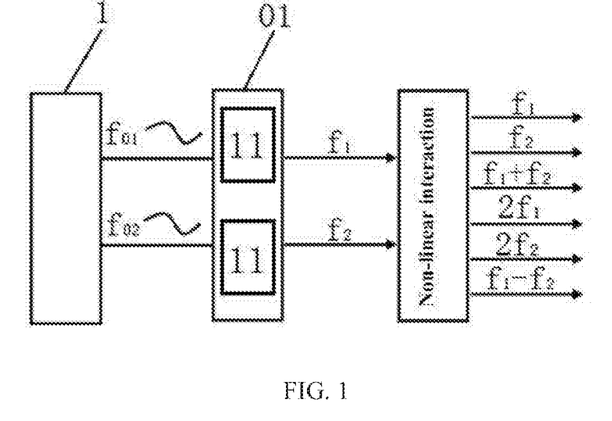
FIG. 1 is a schematic diagram showing the principle of sounding of a sound production device according to an embodiment of the present disclosure.
Figure 2:
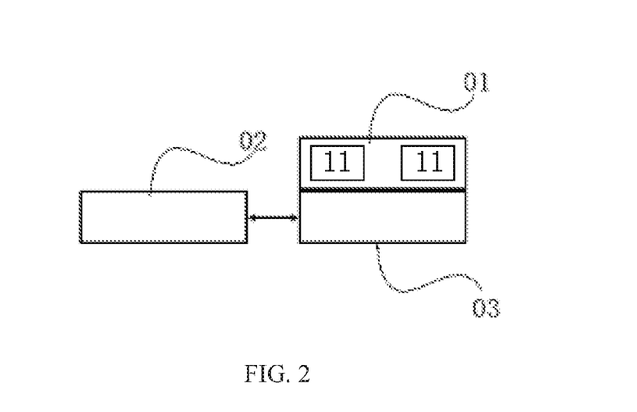
FIG. 2 is a block diagram showing the structure of the sound production device according to the embodiment of the present disclosure.

The plurality of ultrasonic transducers 11 can constitute at least one sounding unit 01, and each sounding unit 01 includes two ultrasonic transducers 11. One of the ultrasonic transducers 11 in each of the sounding units 01 is configured to emit a first ultrasonic wave, and the other ultrasonic transducer 11 is configured to emit a second ultrasonic wave.

The sounding control unit 02 is configured to determine a target direction and output a direction command to the motion unit 03 according to the target direction.

The motion unit 03 is configured to adjust a sounding direction of each ultrasonic transducer 11 according to the direction command such that the two ultrasonic transducers 11 in each sounding unit 01 emit sound toward the target direction to generate a difference frequency sound wave within an audible frequency range in a target area.

In principle, the term "audible" means "audible to human ears". Therefore, the audible frequency can range from 20 Hz to 20,000 Hz.

In the present embodiment, the plurality of ultrasonic transducers 11 can constitute at least one sounding unit 01. In other words, the sound production device comprises at least two ultrasonic transducers 11, from which at least two ultrasonic transducers 11 can be selected to form a sounding unit 01.

Of course, the above combinations may be fixed or varied. In other words, any one of the ultrasonic transducers 11 included in the sound production device can form a sounding unit 01 with one of the other ultrasonic transducers 11.

For example, if the sound production device includes two ultrasonic transducers 11, the two ultrasonic transducers 11 can only constitute one fixed sounding unit 01. If the sound production device includes five ultrasonic transducers 11, namely a first ultrasonic transducer, a second ultrasonic transducer, a third ultrasonic transducer, a fourth ultrasonic transducer and a fifth ultrasonic transducer, in order to complete a directional sounding, the first ultrasonic transducer can be combined with the second ultrasonic transducer to form a sounding unit 01; in order to complete another directional sounding, the first ultrasonic transducer can be combined with the third ultrasonic transducer to form a sounding unit 01; in order to complete still another directional sounding, the second ultrasonic transducer can be combined with the third ultrasonic transducer to form a sounding unit 01, and the fourth ultrasonic transducer can be combined with the fifth ultrasonic transducer to form a sounding units 01. The above combinations of ultrasonic transducers 11 are merely exemplary and more combinations thereof are possible.

In the present embodiment, as shown in FIG. 1, the signal source 1 can respectively output two electrical signals, (i.e., a first electrical signal $f_{01}$ and a second electrical signal $f_{02}$) to the two ultrasonic transducers 11 in the sounding unit 01, respectively. One of the ultrasonic transducers 11 in the sounding unit 01 is configured to process the electrical signal $f_{01}$ to obtain a first ultrasonic wave $f_1$ and to emit the first ultrasonic wave $f_1$ in a target direction, and the other ultrasonic transducer 11 is configured to process the electrical signal $f_{02}$ to obtain a second ultrasonic wave $f_2$ and to emit the second ultrasonic wave $f_2$ in the target direction. The first ultrasonic wave and the second ultrasonic wave emitted are two columns of adjustable ultrasonic waves with different frequencies. Therefore, when the two columns of ultrasonic waves propagate in the air medium, the difference frequency sound wave $f_1-f_2$ which is audible to the human ears can be generated in the target area due to a nonlinear action, that is, the user can hear the sound in the target area, thereby realizing the directional sounding. Of course, high frequency ultrasonic waves with frequencies of $f_1$, $f_2$, $f_1+f_2$, $2f_1$ and $2f_2$ which are inaudible to the human ears are also generated when the difference frequency sound wave is generated. These high frequency ultrasonic waves do not affect the reception of the differential frequency sound wave by the human ears.

In order to generate the first ultrasonic wave and the second ultrasonic wave that meet requirements, each sounding unit 01 may generate the first ultrasonic wave and the second ultrasonic wave in one of the following manners.

In an optional embodiment, one ultrasonic transducer 11 in the sounding units 01 modulates the electrical signal $f_{01}$ into the first ultrasonic wave having a frequency of 20,000 Hz to 30,000 Hz, and the other ultrasonic transducer 11 modulates the electrical signal $f_{02}$ into the second ultrasonic wave having a frequency of 25,000 Hz to 40,000 Hz. In the above manner, ultrasonic waves having a frequency of 20,000 Hz to 40,000 Hz are advantageous to modulation and have an excellent directivity.

In an optional embodiment, the first ultrasonic wave is generated according to a carrier signal and a sound source signal, and the second ultrasonic wave is an ultrasonic wave with a fixed frequency. In the above manner, only a frequency value required for the first ultrasonic wave is calculated in each ultrasonic conversion cycle, and the operational complexity of generating the first ultrasonic wave and the second ultrasonic wave can be reduced.

In principle, the higher the acoustic wave frequency, the smaller the divergence angle and the stronger the directivity of the ultrasonic wave. Therefore, when the two columns of ultrasonic waves emitted by the sounding unit 01 propagate in the air medium, the difference frequency sound waves generated by the non-linear action also have high directivity, such that accurate directional propagation of the sound can be achieved, that is, the directional sounding with excellent directional effect can be achieved.

In addition, the larger the sound source aperture, the narrower the beam of the sound source signal and the stronger the directivity of the ultrasonic wave. When the sound source aperture is much larger than a wavelength of the sound source signal, most of the sound source signals are concentrated in a narrow band. If it is desired to achieve the high directivity of sound source signal audible to the human ears, the sound source aperture is necessarily made large in the related art. However, in this embodiment, a sound source signal from a signal source 1 (for example, a sound card) is modulated into two columns of ultrasonic waves, and the excellent direction can be achieved by the ultrasonic waves. Therefore, the sound source aperture of the sound production device does not need to be too large, or even can be made smaller. Therefore, the sound production device can be well applied to small-sized electronic devices (such as mobile phones, and notebooks).

Based on the above, it can be seen that since the motion unit 03 can adjust the sounding orientation of the sounding unit 01 according to the direction command, the sounding orientation of the sounding unit 01 is changed according to the change of the target direction, and the noise interference to the non-target direction is reduced. At the same time, the sounding unit 01 provides the user with a good privacy sound space, which greatly enhances the user experience.

Further, if the sound production device includes at least four ultrasonic transducers 11, these ultrasonic transducers 11 can be formed into at least two sounding units 01. Therefore, the sounding orientations of the ultrasonic transducers 11 can be adjusted by the motion unit 03 such that the target areas corresponding to the sounding units 01 are different from each other. In this way, the plurality of sounding units 01 can produce sound simultaneously, and the multi-channel difference frequency sound waves generated by the plurality of sounding units 01 that are audible to the human ears do not interfere with each other. The target area corresponding to each sounding unit 01 refers to a propagation area of a difference frequency sound wave generated by each sounding unit 01 that is audible to the human ears.

In order to achieve a change in the orientation of the ultrasonic transducer 11, the ultrasonic transducer 11 may be disposed on the motion unit 03 in one of the following manners.

In an optional embodiment, the sound production device includes a plurality of motion units, and each of the motion units 03 is provided with a single ultrasonic transducer 11. In the above manner, since each of the motion units 03 is configured to only adjust the sounding orientation of a single ultrasonic transducer 11. Therefore, the sounding orientation of a single ultrasonic transducer 11 does not affect the sounding orientations of the remaining ultrasonic transducers 11, and thus the plurality of ultrasonic transducers 11 can have more combinations. In other words, two ultrasonic transducers 11 can be formed into a sounding unit 01 with a high degree of freedom.

In an optional embodiment, the sound production device includes a plurality of motion units, and each of the motion units 03 is provided with two ultrasonic transducers 11 which can form a sounding unit 01. In the above manner, the two ultrasonic transducers 11 are disposed on the motion unit 03 in appropriate positions. The motion unit 03 performs adjustment of the ultrasonic transducers 11 according to the direction command, such that the two ultrasonic transducers 11 can emit sound together toward the target direction, thereby realizing the prompt adjustment of the sounding orientation of the ultrasonic transducers 11 and reducing the operation program of sounding control unit 02.

Furthermore, the sound production device also includes at least three ultrasonic transducers 11. At this point, the sounding control unit includes an ultrasonic transducer selection module and a direction command transmission module.

The ultrasonic transducer selection module is configured to select two of the ultrasonic transducers 11 to form a sounding unit 01 according to the target area. The direction command transmission module is configured to transmit the direction command to the motion unit 03 corresponding to the two ultrasonic transducers 11 forming the sounding unit 01.

In the above manner, each of the ultrasonic transducers 11 has a predetermined sounding range (i.e., an entire range theoretically achievable by an ultrasonic wave emitted from each of the ultrasonic transducers 11 after the adjustment of the motion unit 03). Any two ultrasonic transducers 11 do not necessarily constitute the sounding unit 01. For example, if there is no overlap of the ultrasonic waves emitted from two ultrasonic transducers 11, the two ultrasonic transducers cannot form a sounding unit. In other words, the two ultrasonic transducers 11 capable of forming the sounding unit 01 are required to at least satisfy a condition that the coverage of the ultrasonic waves emitted from the two ultrasonic transducers 11 overlaps, and the overlapping range is the target area reachable by the sounding unit 01. Therefore, in order to ensure that the difference frequency sound wave generated by the sounding unit 01 and audible to the human ears can be generated only in the target area, it is necessary to select two ultrasonic transducers 11 that can satisfy the above condition according to the target area to form the sounding unit 01 corresponding to the target area.

In an optional embodiment, the ultrasonic transducer selection module is further configured to select two ultrasonic transducers 11 that have the sounding range covering the target area to form the sounding unit 01.

As an alternative, selecting two ultrasonic transducers 11 from the plurality of ultrasonic transducers 11 satisfies the condition that the transmitted ultrasounds cover the target area. The two ultrasonic transducers 11 can also satisfy the condition that two columns of ultrasonic waves are emitted and overlap each other in the target area.

Of course, after the target area is determined, the plurality of ultrasonic transducers 11 do not necessarily have only two ultrasonic transducers 11 satisfying the above conditions. For example, there may be at least three ultrasonic transducers 11, and the sounding unit 01 formed by any two ultrasonic transducers 11 can satisfy the above conditions. In other words, there are at least three combinations of the ultrasonic transducers 11 corresponding to the target area. Therefore, at this time, it is necessary to set a selection rule to select one of the above combinations.

In order to conveniently generate a difference frequency sound wave audible to the human ears in the target area, two ultrasonic transducers 11 having the closest pitch are selected to constitute the sounding unit 01.

Figure 3:
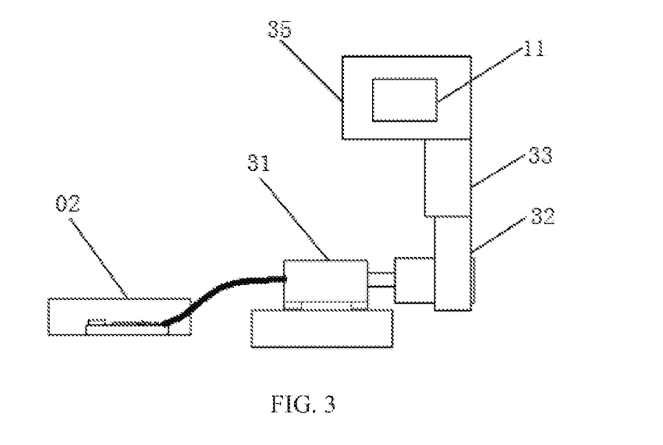
FIG. 3 is a front view showing a sounding direction adjustment component of the sound production device according the an embodiment of the present disclosure.
Figure 4:
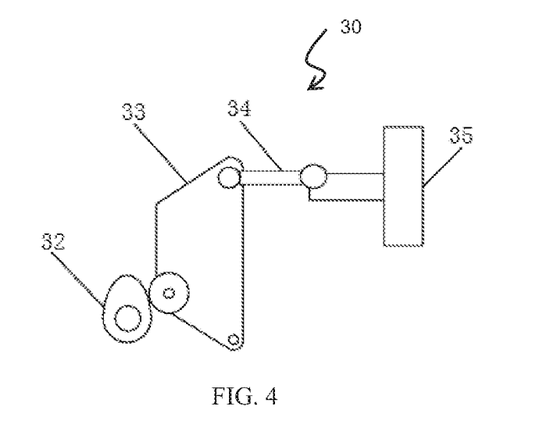
FIG. 4 is a right side view of a transmission module of a motion unit of FIG. 3.

In order to achieve a rapid and precise orientation of the ultrasonic transducer 11 towards the target direction, as shown in FIGS. 3 and 4, an optional structure of the motion unit 03 is provided, wherein each motion unit 03 includes a drive module 31, and a transmission module 30 connected to the drive module 31.

The ultrasonic transducer 11 is mounted on the transmission module 30. The drive module 31 is configured to drive the transmission module 30 to move in accordance with the direction command. The transmission module 30 is configured to drive the ultrasonic transducer 11 to move under the driving of the drive module 31 to cause the ultrasonic transducer 11 to sound toward the target direction.

In the structure of the above-described motion unit 03, the drive module 31 may be a motor, an electric motor or the like that uses electric energy as power, and the drive module 31 and the sounding control unit 02 may be electrically connected. The sounding control unit 02 can also output a direction command to the drive module 31 in a wireless manner, thereby avoiding the arrangement of connection lines between the sounding control unit 02 and the drive module 31. The transmission module 30 can employ various transmission structures that allow the ultrasonic transducer 11 to sound toward the target direction under the driving of the drive module 31, for example, a mechanical arm.

FIGS. 3 and 4 illustrate the structure of the motion unit 03, which includes a rotation shaft configured to output a rotational motion. The transmission module 30 includes a cam mechanism, a connecting rod 34 hinged to the cam mechanism, and a slot 35 connected to the connecting rod 34. The ultrasonic transducer 11 is mounted on the slot 35. The cam mechanism includes a disk cam 32 disposed on the rotation shaft of the drive module 31, and a slider 33 slidably contacting a side wall of the disk cam 32. One end of the connecting rod 34 is hinged to the slider 33, and the other end thereof is connected to the slot 35.

The operation principle of the motion unit 03 is that the drive module 31 drives the disk cam 32 to rotate according to a direction adjustment command, the rotation of the disk cam 32 drives the slider 33 to slide in a direction, the sliding of the slider 33 drives the connecting rod 34 to rotate, and the rotation of the connecting rod 34 allows the ultrasonic transducer 11 mounted on the slot 35 to sound toward the target direction.

It can be seen that the cam mechanism (including the disk cam 32 and the slider 33), the connecting rod 34, and the slot 35 constitute the above-described transmission module 30. On one hand, the transmission module has a reasonable structure, such that the sounding orientation of the ultrasonic transducer 11 can be controlled more accurately. On the other hand, the disk cam 32, the slider 33, the connecting rod 34, and the slot 35 have a high degree of integration and a small overall size, so as to well adapt to increasingly thinner display devices.

In an optional embodiment, the sounding control unit 02 may further include:

a user location acquisition module, configured to acquire current location information of a user; and a target direction determination module, configured to determine the target area according to the current location information of the user, and then determine the target direction.

The coverage (i.e., the target area) of difference frequency sound waves audible to the human ears that can be generated by the two ultrasonic transducers 11 of each sounding unit 01 has a certain correspondence with the target directions of the two ultrasonic transducers 11. As an example, if the target area is determined, the sounding orientation that is the target direction of the two ultrasonic transducers 11 capable of generating the difference frequency sound waves audible to the human ears and covering the target area can be calculated based on the target area. As another example, when the sounding orientation of the two ultrasonic transducers 11 is determined, the coverage of difference frequency sound waves audible to the human ears that can be generated by the two ultrasonic transducers 11 can be calculated.

In principle, the generated difference frequency sound wave audible to the human ears should cover an area where the user is located, and the current location information of the user includes area information of the user. Therefore, the sounding orientation that is the target direction of the two ultrasonic transducers 11 capable of generating the difference frequency sound waves audible to the human ears in the target area can be determined according to the target area (i.e., the user location).

The target direction determination module is configured to determine the target direction based on the current location information of the user. Specifically, after the current location of the user is determined, an area defined by extending outward a distance from the current location of the area where the user is located is used as the target area, such that the target direction of two ultrasonic transducers 11 can be calculated according to the target area.

Similarly, after the area where the user is located is determined, connecting lines between the two ultrasonic transducers 11 included in the sounding unit 01 and a reference point in the area where the user is located may be used as the target directions of two ultrasonic transducers 11. If the two ultrasonic transducers 11 emit ultrasonic waves toward the target directions, respectively, the two ultrasonic waves can cover the area where the user is located, and then the two ultrasonic waves overlap each other in the area where the user is located to generate a nonlinear interaction, that is, the differential frequency sound waves audible to the human ears are generated within the area where the user is located. The reference point(s) corresponding to the two ultrasonic transducers 11 of the sounding unit 01 may be the same or different.

If the location of the user changes, the target area that is the target directions of the ultrasonic transducers 11 can be re-determined. By means of the motion unit 03, it is possible to change the sounding orientation of the ultrasonic transducer 11 in accordance with the current location of the user, that is, the sounding orientation of the ultrasonic transducer 11 is changed in accordance with the target direction. Therefore, the sound production device in this embodiment improves the user experience and is user-friendly.

Of course, the "user" in the above scheme may be replaced with other reference objects, such as other animals or an object.

In addition, the target area in the above solution may also be at least one target area specified in advance, in such a manner that the target direction is also determined.

However, even if the target direction is determined, it is not necessary to continuously transmit the first ultrasonic wave and the second ultrasonic wave to the target side. For example, the sounding control unit 02 includes an infrared sensor which can detect whether the target area (a predetermined area of the user) has a reference object (a person, another animal, or an object), and if the reference object is detected, the motion unit 03 is activated to orient the two ultrasonic transducers 11 of the sounding unit 01 toward a target direction in which the difference frequency sound waves can be generated in the target area.

In the above scheme, it is possible to first determine whether the target area has a reference object, and then determine whether the ultrasonic transducer 11 emits sound, such that the transmission power of the ultrasonic transducer 11 can be saved.

Figure 5:
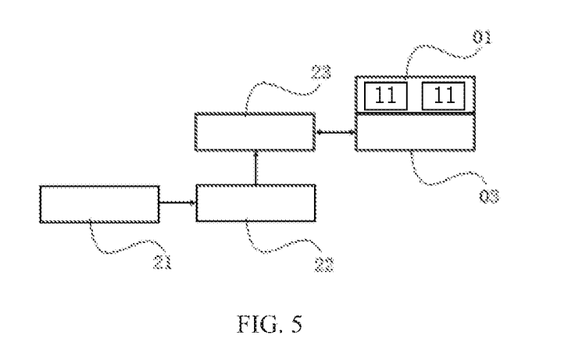
FIG. 5 is a block diagram of another structure of a sound production device according to an embodiment of the present disclosure.

In an optional embodiment, as shown in FIG. 5, the user location acquisition module includes: an image capture sub-module 21 configured to acquire an image of a predetermined area; a face recognition sub-module 22 configured to recognize face information of the user from the image of the predetermined area; and an image analysis sub-module 23 configured to calculate the current location information of the user based on the recognized face information of the user.

In an optional embodiment, the image capture sub-module 21 may be a CCD camera.

In the above scheme, the face recognition sub-module 22 may be further configured to recognize the relative position of the facial image of the user in the image of the predetermined area, according to which the current location information of the user may be calculated. The facial image of a person has many effective features, such that it is easy to implement the face recognition. Moreover, the facial images of different persons are quite different, such that it is easy to implement the calculation process of distinguishing different users by face recognition.

Further, the location of the user's facial image that is the location where the user's ear is located can be recognized. Therefore, the method of using facial recognition can be said to locate the current location information of the user or to locate the location of user's ears. According to the embodiment, it is possible to more realize the accurate generation of the difference frequency sound wave (sound) in the area where the user's ears are located, and realize the accurate positioning and generation of the sound.

Further, the recognition of the user's face from the image of the predetermined area may further include: determining the presence of a facial image of the user in the image of the predetermined area, and adjusting a sounding mode of the sounding unit 01 according to recognition result. As example, if the user's facial image cannot be recognized within the image of the predetermined area, the sounding unit 01 may stop sounding or lower down a volume of sound. As another example, if a non-target image (for example, a facial image other than a designated user or a user-specified image or the like) is recognized in the image of the predetermined area, the sounding unit 01 stops the sounding. In addition, there are other possible adjustment ways, the details of which will be omitted herein.

In order to facilitate the selection of the target direction of the ultrasonic transducer 11, a plurality (at least three) of the ultrasonic transducers 11 may adopt any one of the following arrangements.

In an optional embodiment, at least three ultrasonic transducers 11 are arranged in a row. The ultrasonic transducers 11 are all arranged in a row, and in particular, ultrasonic wave emitting surfaces of the ultrasonic transducers 11 are arranged in a row. In other words, the emitting surfaces of all the ultrasonic transducers 11 are arranged in a straight line. In the above arrangement of the ultrasonic transducers 11, when the ultrasonic transducers 11 are arranged in a row, the positional relationship between the different ultrasonic transducers 11 is relatively fixed. Therefore, it is relatively easy to select and adjust to allow two ultrasonic transducers 11 to constitute a sounding unit 01.

Figure 7:
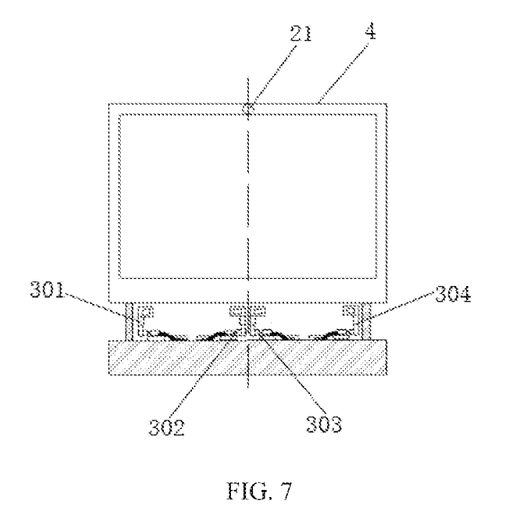
FIG. 7 is a schematic diagram showing a structure of a display system according to an embodiment of the present disclosure.

In an optional embodiment, the ultrasonic wave emitting surfaces of the at least four ultrasonic transducers 11 are placed on the same plane, as shown in FIG. 7. In the above arrangement of the ultrasonic transducers 11, since the emitting surfaces of the ultrasonic transducers 11 are placed on the same plane, the generated difference frequency sound waves audible to human ears are all emitted from a single plane. In this way, a propagation range of the difference frequency sound waves audible to the human ears can be accurately determined, thereby accurately calculating the target area or the target direction of the ultrasonic transducers 11.

Figure 6:
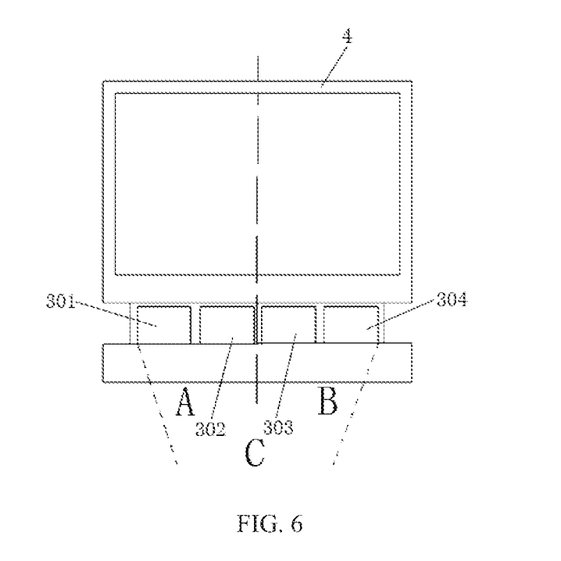
FIG. 6 is a schematic diagram showing regional sounding of a display system according to an embodiment of the present disclosure.
Figure 8:
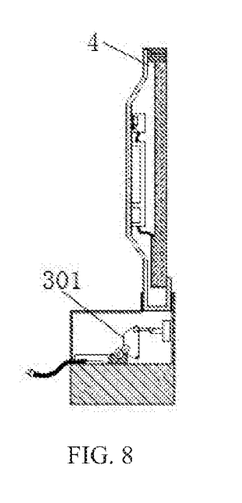
FIG. 8 is a left side view of the display system of FIG. 7.

As shown in FIGS. 6 to 8, in an embodiment of the present disclosure, there is provided a display system including: a display device 4 and the sound production device described in the above embodiments.

The sound production device may include four sets of sounding direction adjustment components, each set of which includes a motion unit 03 and an ultrasonic transducer 11 disposed on the motion unit 03. As shown in FIG. 6, the four sets of sounding direction adjustment components are symmetrically distributed in relation to a middle dotted line as a symmetrical line, and from left to right they are: a first sounding direction adjustment component 301, a second sounding direction adjustment component 302, a third sounding direction adjustment component 303, and a fourth sounding direction adjustment component 304.

In an optional embodiment, the motion unit 03 may be the motion unit 03 as shown in FIGS. 3 and 4. Although a set of sounding direction adjustment component corresponding to a single sounding control unit 02 is shown in FIG. 7, the four sets of sounding direction adjustment components can be controlled by a single sounding control unit 02 in order to simplify the structure.

In an optional embodiment, when the image capture sub-module 21, the face recognition sub-module 22, the image analysis sub-module 23 are provided, the image capture sub-module 21 may be disposed on the display device 4.

An exemplary embodiment of the present disclosure provides an optional sounding method suitable for a display system, including:

in the case where the user is in an area A in front of a display screen of the display device 4 and between a middle dotted line and a leftmost dotted line, an ultrasonic transducer 11 of the first sounding direction adjustment component 301 and the an ultrasonic transducer 11 of the second sounding direction adjustment component 302 can form a sounding unit 01 that generates difference frequency sound waves in the area A;

in the case where the user is in an area B in front of the display screen of the display device 4 and between a middle dotted line and a rightmost dotted line, an ultrasonic transducer 11 of the third sounding direction adjustment component 303 and an ultrasonic transducer 11 of the fourth sounding direction adjustment component 304 can form a sounding unit 01 that generates difference frequency sound waves in the area B; and in the case where the user is in an area C in front of the display screen of the display device 4 and between the leftmost dotted line and the rightmost dotted line, the ultrasonic transducer 11 of the first sounding direction adjustment component 301 and the ultrasonic transducer 11 of the fourth sounding direction adjustment component 304 can form a sounding unit 01 that generates difference frequency sound waves in the area C.

In an optional embodiment, the two ultrasonic transducers 11 can also be mounted together on a slot 35, and the two ultrasonic transducers 11 mounted on a slot 35 can form a sounding unit 01.

Figure 9:
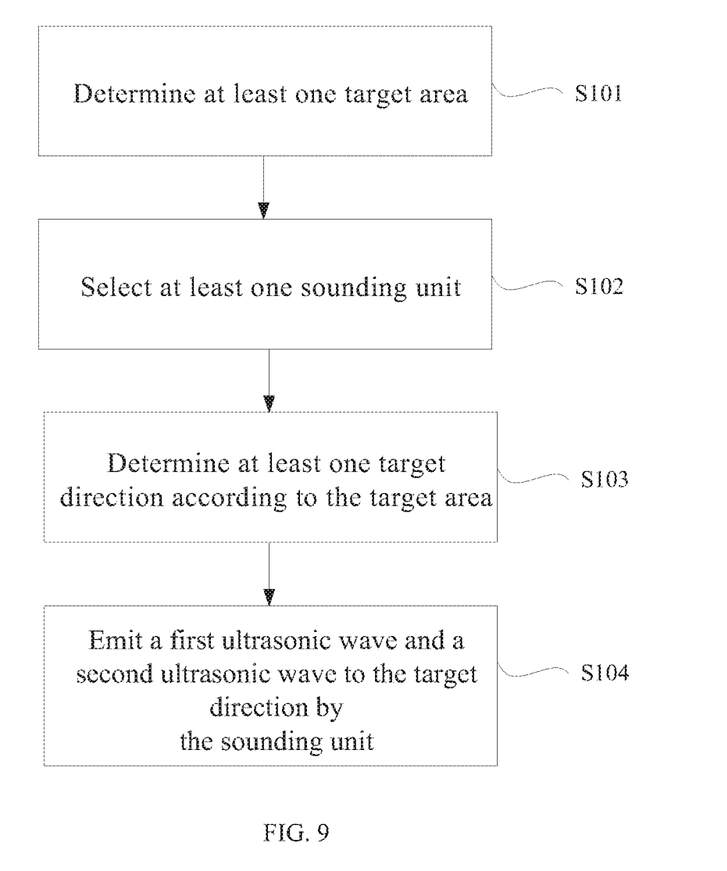
FIG. 9 is a flowchart illustrating a sound production method according to an embodiment of the present disclosure.

As shown in FIG. 9, in an embodiment of the present disclosure, there is provided a sound production method for a sound production device. The sound production device for realizing the sound production method may be any one of the above sound production devices as shown in FIGS. 1 to 8. The sound production method includes:

Step 101, determining at least one target area;

Step 102, selecting at least one sounding unit;

Step 103: determining at least one target direction according to the target area; and Step 104: emitting a first ultrasonic wave and a second ultrasonic wave to the target direction by ultrasonic transducers of the sounding unit, wherein the first ultrasonic wave and the second ultrasonic wave generate difference frequency sound waves having an audible frequency range in the target area.

In the present embodiment, the emitted first and second ultrasonic waves are two columns of ultrasonic waves having different frequencies and being adjustable. Therefore, when two columns of ultrasonic waves propagate in the air medium, audible difference frequency sound waves can be generated in the target area due to the nonlinear action. The ultrasonic waves have high directivity. Therefore, the difference frequency sound waves also have high directivity. It can be seen that the above-mentioned sound production method has an excellent effect of directional sounding and is easy to implement.

In an optional embodiment, Sep 101 includes: determining current location information of a user, and determining the target area according to the current location information of the user.

In the above scheme, the target area can be changed according to the position change of the user, that is, the generation area of the difference frequency sound wave changes in accordance with the user location, thereby improving the user experience.

In an optional embodiment, when at least three ultrasonic transducers are provided. Step 102 includes: selecting two ultrasonic transducers from the plurality of ultrasonic transducers to form the sounding unit according to the target area.

In an optional embodiment, Step 104 includes: adjusting the sounding unit according to the target direction and emitting the first ultrasonic wave and the second ultrasonic wave toward the target direction.

In the above scheme, the sounding unit specifically emits the first ultrasonic wave and the second ultrasonic wave by the first ultrasonic transducer and the second ultrasonic transducer, respectively, wherein the sounding direction of the first ultrasonic wave emitted by the first ultrasonic transducer is a first direction, and the sounding direction of the second ultrasonic wave emitted by the second ultrasonic transducer is a second direction. The first direction and the second direction are the target directions (specifically, the first target direction and the second target direction, respectively). Of course, the first direction and the second direction may be the same or different.

It is to be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

The invention claimed is:

1. A sound production device comprising: at least three ultrasonic transducers, a sound generation controller, and an actuator, wherein the at least three ultrasonic transducers can constitute at least one sound generator, each of the sound generators includes two ultrasonic transducers, and one of the ultrasonic transducers in each of the sound generators is configured to emit a first ultrasonic wave, and the other ultrasonic transducer is configured to emit a second ultrasonic wave;

the sound generation controller includes an ultrasonic transducer selector and a direction command transmitter and is configured to determine a target direction and output a direction command to the actuator according to the target direction, wherein the ultrasonic transducer selector is configured to select two of the ultrasonic transducers to form the sound generator according to the target area, and the direction command transmitter is configured to transmit the direction command to the actuator corresponding to the two ultrasonic transducers forming the sound generator; and the actuator is configured to adjust a sounding direction of each ultrasonic transducer according to the direction command, such that two ultrasonic transducers in each sound generator emit sound toward the target direction to generate a difference frequency sound wave within an audible frequency range in a target area, wherein each of the at least three ultrasonic transducers has a predetermined sounding range; and the ultrasonic transducer selector is further configured to select two of the at least three ultrasonic transducers that have the sounding range covering the target area to form the sound generator, and wherein the ultrasonic transducer selector is further configured to select two of the at least three ultrasonic transducers having the closest pitch to constitute the sound generator in the case where the at least three ultrasonic transducers have the sounding range covering the target area.

2. The sound production device according to claim 1, wherein the sound production device comprises a plurality of actuators, each of which is provided with a single ultrasonic transducer.

3. The sound production device according to claim 1, wherein the sound production device comprises a plurality of actuators, each of which is provided with two ultrasonic transducers, the two ultrasonic transducers forming a single sound generator.

4. The sound production device according to claim 1, wherein the sound production device includes a plurality of actuators, each of which includes a driver and a transmission assembly connected to the driver;

each ultrasonic transducer is mounted on the transmission assembly;

the driver is configured to drive the transmission assembly to move in accordance with the direction command; and the transmission assembly is configured to drive each ultrasonic transducer to move under the driving of the driver to cause each ultrasonic transducer to sound toward the target direction.

5. The sound production device according to claim 1, wherein the sound generation controller includes:

a user location detector, configured to acquire current location information of a user; and a target direction calculator, configured to determine the target area according to the current location information of the user, to determine the target direction.

6. The sound production device according to claim 5, wherein the user location detector includes:
   an image sensor, configured to acquire an image of a predetermined area;
   a face recognizer, configured to recognize face information of the user from the image of the predetermined area; and
   an image analyzer, configured to calculate the current location information of the user according to the recognized face information of the user.

7. The sound production device according to claim 1, wherein
   the sound production device includes at least three ultrasonic transducers, and the at least three ultrasonic transducers are arranged in a row.

8. The sound production device according to claim 1, wherein the sound production device includes at least four ultrasonic transducers, and ultrasonic wave emitting surfaces of the at least four ultrasonic transducers are placed on the same plane.

9. A display system comprising: a display device and a sound production device, the sound production device including at least three ultrasonic transducers, a sound generation controller, and an actuator, wherein
   the at least three ultrasonic transducers can constitute at least one sound generator, each of the sound generators includes two ultrasonic transducers, and one of the ultrasonic transducers in each of the sound generators is configured to emit a first ultrasonic wave, and the other ultrasonic transducer is configured to emit a second ultrasonic wave;
   the sound generation controller includes an ultrasonic transducer selector and a direction command transmitter and is configured to determine a target direction and output a direction command to the actuator according to the target direction, wherein the ultrasonic transducer selector is configured to select two of the ultrasonic transducers to form the sound generator according to the target area, and the direction command transmitter is configured to transmit the direction command to the actuator corresponding to the two ultrasonic transducers forming the sound generator; and
   the actuator is configured to adjust a sounding direction of each ultrasonic transducer according to the direction command, such that two ultrasonic transducers in each sound generator emit sound toward the target direction to generate a difference frequency sound wave within an audible frequency range in a target area, wherein
   each of the at least three ultrasonic transducers has a predetermined sounding range; and the ultrasonic transducer selector is further configured to select two of the at least three ultrasonic transducers that have the sounding range covering the target area to form the sound generator, and wherein the ultrasonic transducer selector is further configured to select two of the at least three ultrasonic transducers having the closest pitch to constitute the sound generator in the case where the at least three ultrasonic transducers have the sounding range covering the target area.

10. The display system according to claim 9, wherein the sound production device includes a plurality of actuators, each of which includes a driver and a transmission assembly connected to the driver;
   each ultrasonic transducer is mounted on the transmission assembly;
   the driver is configured to drive the transmission assembly to move in accordance with the direction command; and
   the transmission assembly is configured to drive each ultrasonic transducer to move under the driving of the driver to cause each ultrasonic transducer to sound toward the target direction.

11. The display system according to claim 9, wherein the sound generation controller includes:
   a user location detector, configured to acquire current location information of a user; and
   a target direction calculator, configured to determine the target area according to the current location information of the user, to determine the target direction.

12. A sound production method for a sound production device, the sound production device including at least three ultrasonic transducers, the at least three ultrasonic transducers being capable of forming at least one sound generator, each of the sound generators including two ultrasonic transducers, the method includes steps of:
   determining at least one target area;
   selecting at least one sound generator;
   determining at least one target direction according to the target area; and
   emitting a first ultrasonic wave and a second ultrasonic wave to the target direction by ultrasonic transducers of the sound generator, wherein the first ultrasonic wave and the second ultrasonic wave generate difference frequency sound waves having an audible frequency range in the target area, wherein
   the step of selecting at least one sound generator further comprises: selecting two of the at least three ultrasonic transducers having the closest pitch to constitute the sound generator in the case where the at least three ultrasonic transducers have the sounding range covering the target area.

13. The sound production method according to claim 12, wherein the step of determining at least one target area comprises:
   determining current location information of a user, and determining the target area according to the current location information of the user.

14. The sound production method according to claim 13, wherein the step of determining the current location information of a user comprises:
   acquiring an image of a predetermined area;
   recognizing face information of the user from the image of the predetermined area; and
   calculating the current location information of the user according to the recognized face information of the user.

15. The sound production method according to claim 12, wherein
   the sound production device includes a plurality of actuators, each of which includes a driver and a transmission assembly connected to the driver;
   each ultrasonic transducer is mounted on the transmission assembly;
   the driver is configured to drive the transmission assembly to move in accordance with the direction command; and
   the transmission assembly is configured to drive each ultrasonic transducer to move under the driving of the driver to cause each ultrasonic transducer to sound toward the target direction.

* * * * *